(12) United States Patent
Mixer et al.

(10) Patent No.: US 10,291,506 B2
(45) Date of Patent: May 14, 2019

(54) ANOMALY DETECTION IN INDUSTRIAL COMMUNICATIONS NETWORKS

(71) Applicant: FISHER-ROSEMOUNT SYSTEMS, INC., Round Rock, TX (US)

(72) Inventors: Robert A. Mixer, Cedar Park, TX (US); Gary K. Law, Georgetown, TX (US); Andrew E. Cutchin, Killeen, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 155 days.

(21) Appl. No.: 14/638,904

(22) Filed: Mar. 4, 2015

(65) Prior Publication Data

US 2016/0261482 A1    Sep. 8, 2016

(51) Int. Cl.
*H04L 12/26*    (2006.01)
*H04L 29/06*    (2006.01)

(52) U.S. Cl.
CPC .............. *H04L 43/12* (2013.01); *H04L 43/04* (2013.01); *H04L 63/00* (2013.01)

(58) Field of Classification Search
CPC ................................ H04L 43/12; H04L 43/04
USPC ......................................................... 709/224
See application file for complete search history.

(56) References Cited

U.S. PATENT DOCUMENTS

| | | | | |
|---|---|---|---|---|
| 8,612,573 B2* | 12/2013 | Seidman | ............. | G06F 11/3419 |
| | | | | 709/223 |
| 8,819,212 B1* | 8/2014 | Nair | ................... | G06F 17/30705 |
| | | | | 709/223 |
| 2002/0035683 A1 | 3/2002 | Kaashoek et al. | | |
| 2005/0262237 A1* | 11/2005 | Fulton | ................. | H04L 43/0882 |
| | | | | 709/224 |

(Continued)

FOREIGN PATENT DOCUMENTS

| | | |
|---|---|---|
| EP | 2 328 315 A1 | 6/2011 |
| WO | WO-2014/155650 A1 | 10/2014 |
| WO | WO-2016/057691 A1 | 4/2016 |

OTHER PUBLICATIONS

Search Report for Application No. GB1602098.4, dated Aug. 2, 2016.

*Primary Examiner* — Brian Whipple
(74) *Attorney, Agent, or Firm* — Marshall, Gerstein & Borun LLP

(57) ABSTRACT

An anomaly detection system installed in a plant communications network detects unexpected changes or anomalies in the traffic patterns over the communications network to detect infected or potentially infected nodes. The anomaly detection system includes various data collection modules at each of the nodes of the network which operate to view the message traffic into and out of the node and to generate metadata pertaining to the message traffic. The communication modules at the nodes send the traffic metadata to an anomaly analysis engine, which processes the metadata using a rules engine that analyzes the metadata using a set (Continued)

of logic rules and traffic pattern baseline data to determine if current traffic patterns at one or more network nodes are anomalous. If so, the analysis engine may generate an alert or message to a user informing the user of the potentially infected node, may automatically disconnect the node from the network, or may take some other action to minimize the effects of an infected node.

47 Claims, 4 Drawing Sheets

(56) References Cited

U.S. PATENT DOCUMENTS

| | | | | |
|---|---|---|---|---|
| 2005/0262554 | A1* | 11/2005 | Brooks | H04L 63/0263 726/11 |
| 2011/0119100 | A1* | 5/2011 | Ruhl | G06F 17/3089 705/7.11 |
| 2012/0030761 | A1 | 2/2012 | Baba et al. | |
| 2014/0068067 | A1* | 3/2014 | Bansal | H04L 43/022 709/224 |
| 2015/0120914 | A1* | 4/2015 | Wada | H04L 43/04 709/224 |
| 2015/0149611 | A1* | 5/2015 | Lissack | H04L 43/0817 709/224 |
| 2016/0085237 | A1 | 3/2016 | Yunoki et al. | |

\* cited by examiner

ANOMALY DETECTION IN INDUSTRIAL COMMUNICATIONS NETWORKS

FIELD OF TECHNOLOGY

This application relates generally to process or industrial plant communications systems and, more particularly, to detecting intrusions into control and maintenance communications networks, such as those used in process and industrial control systems, based on message traffic anomaly detection within the plant communications networks.

DESCRIPTION OF THE RELATED ART

Process or industrial control and maintenance systems, such as distributed or scalable process control systems like those used in power generation, chemical, petroleum, or other manufacturing processes, typically include one or more controllers communicatively coupled to each other, to at least one host or operator workstation via a process control network and to one or more field devices via analog, digital or combined analog/digital buses. The field devices, which may be, for example valves, valve positioners, switches and transmitters (e.g., temperature, pressure and flow rate sensors), perform functions within the process or plant such as opening or closing valves, switching devices on and off and measuring process parameters. The controllers receive signals indicative of process or plant measurements made by the field devices and/or other information pertaining to the field devices, use this information to implement one or more control routines, and then generate control signals which are sent over the buses or communication channels of the plant network to the field devices to control the operation of the process or plant. Information from the field devices and the controller is typically made available, via the communications network, to one or more applications executed by the operator workstation to enable an operator or maintenance person to perform any desired function with respect to the process or plant, such as viewing the current state of the plant, modifying the operation of the plant, calibrating devices, detecting faulty devices, etc.

During operation, the process controllers, which are typically located within the process plant environment, are configured according to a configuration scheme to periodically or regularly receive signals indicative of process measurements or process variables made by or associated with the field devices and/or other information pertaining to the field devices, and execute controller applications using this information. The controller applications implement, for example, different control modules that make process control decisions, generate control signals based on the received information, and coordinate with the control modules or blocks in the field devices such as HART® and FOUNDATION® Fieldbus field devices. Further, the control modules in the process controllers send the control signals over the communication lines or other signal paths to the field devices, again according to a configuration scheme, to thereby control the operation of the process.

Information from the field devices and the process controllers is typically also made available to one or more other hardware devices within or external to the plant, such as, for example, operator workstations, maintenance workstations, servers, personal computers, handheld devices, data or event historians, report generators, centralized databases, etc., via one or more secured process control or maintenance networks. The information communicated over the process control or maintenance communications networks enables an operator or a maintenance person to perform desired functions with respect to the process and/or to view the operation of the plant or devices within the plant. For example, the control information allows an operator to change settings of process control routines, to modify the operation of the control modules within the process controllers or the smart field devices, to view the current state of the process or status of particular devices within the process plant, to view alarms and or alerts generated by field devices and process controllers, to simulate the operation of the process for the purpose of training personnel or testing the process control software, to diagnose problems or hardware failures within the process plant, etc.

The field devices and controllers usually communicate with the other hardware devices over one or more secured process control or maintenance communications networks which may be, for example, implemented as an Ethernet-configured LAN. The process control or maintenance communications network sends the process parameters, network information, and other process control data through various network devices and to various entities in the process control system. Typical network devices include network interface cards, network switches, routers, servers, firewalls, controllers, operator workstations, and databases. The network devices typically facilitate the flow of data through the network by controlling its routing, frame rate, timeout, and other network parameters, but do not change the process data itself. As the process control network grows in size and complexity, the number and type of network devices correspondingly increases. As a result of system and network growth, security within and management of these complex systems is becoming increasingly difficult. As a start however, these networks are generally isolated from other external networks and are protected from external attacks by one or more firewalls.

Generally, in a typical industrial control system, in order to limit intrusions into the network, the plant control system workstations/servers are strategically placed between external plant networks that perform various functions associated with the plant, and the embedded control devices that perform control and data acquisition functions (e.g. controllers, PLCs, RTUs) within the control system. A major security objective for the control workstations/servers is to prevent malware from entering the control and maintenance system and adversely affecting the embedded devices, as well to prevent malware from changing the configuration and historical data stored in the plant process control databases. Still further, these workstations/servers prevent unauthorized access to the control system to prevent unauthorized changing of the plant configuration, unauthorized access to plant data, etc. While a number of security features, such as firewalls, "anti-virus" software and "white listing" can be used to address these security objectives, these security features are typically not sufficient. For example, anti-virus software cannot protect against "zero-day" viruses, and white listing only prevents unauthorized applications from running. In addition, some of these features are too intrusive to be operationally practical in a process control system because these security features have the potential to impede activities of plant operators.

In a general sense, malware, such as that at the heart of a zero-day attack, is typically introduced into the secured control system network via an authorized communications connection to an external network by operation of an application or a service that has the privilege or authorization to access the memory devices, network ports or direct data links within the process control network. Alternatively, malware may also be introduced into the secured control system network via local personnel that connect infected portable devices and/or media to a control system device. Thereafter, the malware is able to be propagated to other devices (e.g., via communications) and/or to be executed within a device within the process control network using the security privileges of the applications or services that become infected with the malware. In addition, the malware may locally persist itself to allow it to be executed again after reboot of networked devices. In some cases, the malware may escalate the privileges of a host, e.g., an infected application or a service, using the privileges of the account under which the application or service is being executed and, in doing so, the malware may be able to perform actions or operations within the process control device or network device that require a higher privilege, and are thus typically more detrimental to the control system operation. These attacks can have serious and potentially destructive or even deadly effects within a process plant when these attacks disrupt the on-going operation of the plant control system.

There has been a significant amount of research activity into defining and building hardware and software configurations that operate to prevent or limit attacks on process or industrial control and maintenance networks. However, even tightly defended industrial control system (ICS) networks or supervisory control and data acquisition (SCADA) networks are still subject to security threats such as misconfiguration of security defenses, users with legitimate access acting with malicious intent, and publicly unknown but malicious software acting on behalf of outside attackers. Moreover, once a network is infected, there is only a limited ability to automatically detect the existence of viruses or malware within a process control or industrial control device or in plant communication nodes. Generally speaking, once an attack becomes successful in a plant environment, it generally requires an operator, a maintenance person, etc. to detect that a plant communication node or device is infected. While it is possible to run background virus scanning software at each node of a communications network, this software takes a lot of memory and processing resources, needs to be updated regularly (requiring significant network maintenance resources and time), and is still incapable of detecting zero-day viruses.

In many cases, viruses or unauthorized software at a plant device or network node may cause decreased performance of the device or network, may interrupt normal plant operations enough to cause errors or alarms to be generated at that node or other nodes within the network, or may cause other serious and noticeable issues. In some of these cases, it may be relatively easy for an operator or other plant personnel to detect the existence of a virus, but it may still be difficult to detect the location of the virus. Moreover, in many other cases, the virus or attack may operate undetected for a significant period of time because, while it may degrade network operations slightly, this degradation or other effect on the plant operation may be negligible, and so may be very difficult to detect. As a result, in many cases, viruses may go undetected for significant periods of time, during which time these viruses may operate to reduce plant efficiencies, to allow theft of plant data, to enable more serious intrusions, to expose network devices to serious attack or harm, etc.

SUMMARY

A control system, such as an industrial or process plant control or maintenance system, implements a communications network threat detection system that uses anomaly detection of communications sent over the network to detect potentially infected network nodes. Generally speaking, the anomaly detection system detects unexpected changes or anomalies in the traffic patterns over the communications network to detect infected or potentially infected nodes. While such anomaly detection is difficult to perform in standard, open communications networks because of the ever-changing configuration of the nodes on those networks, anomaly detection can be used more effectively in process plant or industrial control networks because of the relatively static configuration of the network nodes, as well as the a priori nature of process or industrial control or maintenance system configurations used in the plant or network.

The anomaly detection system described herein generally distributes data collection processing workloads across the network nodes of a communications system to thereby reduce the anomaly detection workloads at each node. Moreover, the anomaly detection system described herein reduces the anomaly analysis workload based on a knowledge of the network configuration and by reporting metadata about network traffic across the network for analysis instead of requiring a separate monitoring network. The anomaly detection system described herein also reduces the false positive rate of the anomaly detection analysis by receiving notifications of and accounting for authorized network configuration changes or automated reconfiguration activities (e.g. due to high availability mechanisms). Still further, the anomaly detection system described herein may use the same data to perform multiple types of anomaly analysis (e.g. security or maintenance), and enables hierarchical analysis/reporting performed on any network node in the industrial control system through any combination of pre-defined rules and machine learning.

DESCRIPTION

Generally speaking, a network security system described herein implements threat detection by detecting anomalies in network traffic patterns (e.g., traffic or message content, frequency, time, length, etc.) at nodes or across nodes of an industrial system or process control network, and performs effectively because the a priori nature of the industrial system or process control network configuration enables measured traffic patterns to be compared to expected or known patterns. That is, the configuration of network communications in process control, industrial system or plant automation networks is generally fairly well known prior to implementation or operation of the communications network, and thus network traffic patterns do not tend to change significantly during use or operation of these networks. Instead, network communication traffic patterns tend to be fairly static (in a statistical sense) during operation of the communications network and, thus, changes in the network patterns, especially in a statistical sense, may be indicative of an intrusion into the network that is not part of the original or desired configuration.

A typical problem with network based anomaly detection systems is that the analysis engine, which is the engine that parses messages or traffic to detect changes in traffic patterns, must have access to the messages being received and sent at each network node. This requirement means that a separate analysis engine must be executed at each network node or that message traffic at each node must be sent over the network to a centralized anomaly detection engine for analysis. In the first case, the analysis engine at each node is limited to parsing or analyzing message traffic at a single node, which makes the analysis engine less effective than one that can analyze message traffic across the entire network. Moreover, in this case, the analysis engine can take a great deal of processing power from a node, which may limit or slow the node when performing other tasks. In the second case, the network may become bogged down with traffic, as each node must send all messages to the centralized analysis engine, which requires each message received at each node on the network to be redundantly sent (over the network bus or communication channel) to the centralized analysis engine node.

Because all network traffic must be visible to the analysis engine for effective anomaly detection (which is a serious problem in segmented networks), centralized collection does not scale well to hundreds of network endpoints. Additionally, near-real time endpoints in process plant networks tend to have limited computing resources for security tasks, which limits the ability of these end-point devices to run or execute powerful traffic anomaly detection systems. Moreover, network links can have varying capacity and performance characteristics, and mid-stream control system configuration changes can generate a large number of false positives.

Figure 1:
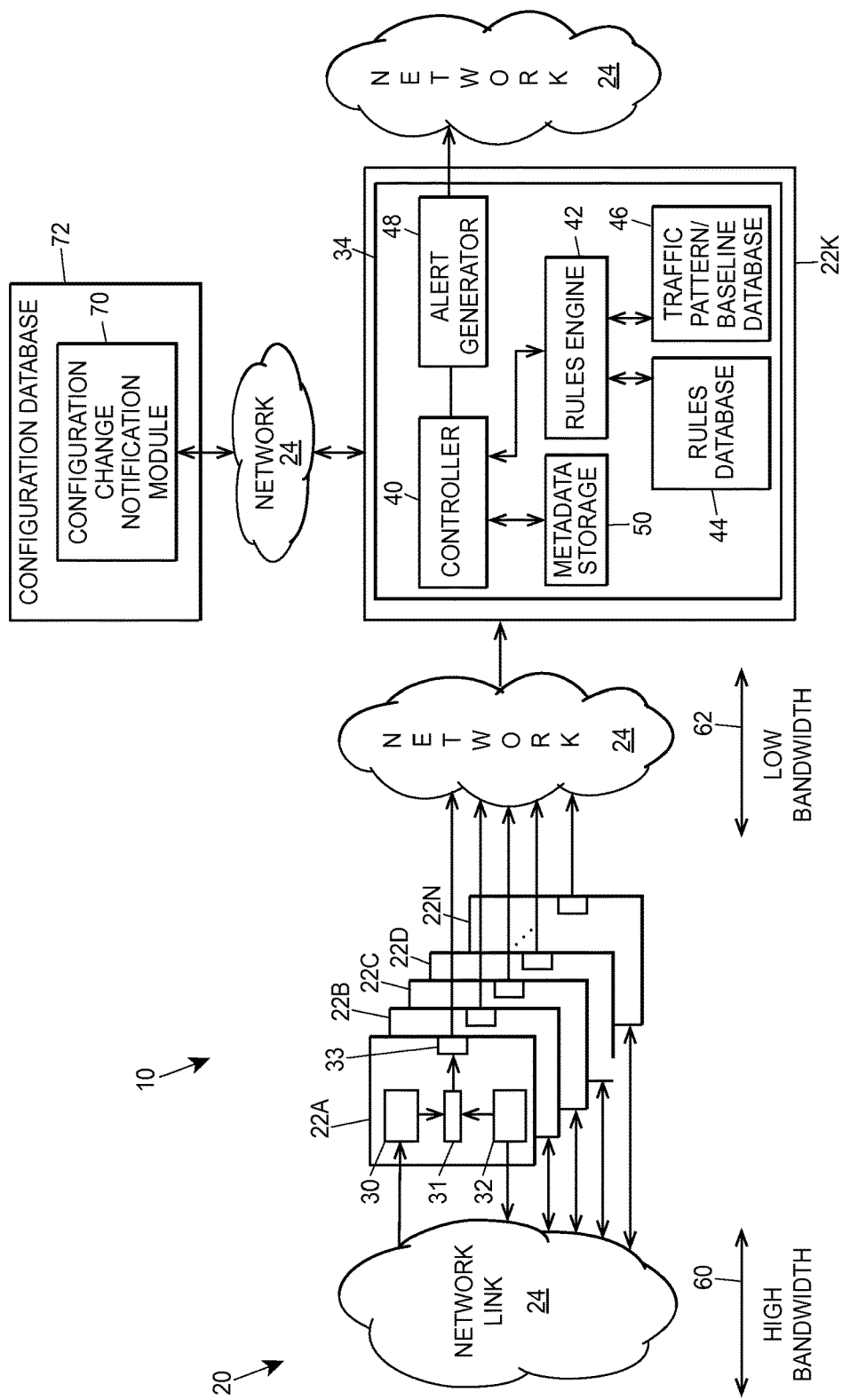
FIG. 1 is an exemplary communication flow diagram of a process control network having an anomaly detection system installed therein.

FIG. 1 depicts an example network anomaly detection system 10 that operates to reduce or eliminate these problems. Generally speaking, the anomaly detection system 10 is a distributed system in that it includes data collection modules disposed at each network node that operate to send information regarding message traffic to a more centralized analysis engine. While the data collection modules operate to collect and analyze message traffic going into and coming out of the network nodes, the data collection modules do not send the messages themselves to the analysis engine, but instead create metadata describing this message traffic and send the metadata to the analysis engine. The centralized analysis engine receives the traffic metadata collected at each network node, and operates to analyze this metadata to detect message traffic anomalies, which may be indicative of an intrusion into the network.

More particularly, as indicated in FIG. 1, the anomaly detection system 10 operates in a network 20 (which may be a process plant network, a process control and/or maintenance network, an industrial control system network, an automation network, or any other type of network) having various distributed network nodes 22A-22N connected together via a communication link 24. The communication link 24 may be a wired or wireless communication link (or a combination thereof) and may use any desired type of communication protocol or protocols to perform communications, which are typically packet-based communications. The anomaly detection system 10 includes various modules or components disposed at the different nodes of the network 20, including message collection modules 30 and 32 and an anomaly analysis engine 34 disposed in at least one node, illustrated as a node 22K in FIG. 1. As particularly illustrated in FIG. 1, each network node 22 may have one or more message analysis collection modules 30 and 32, including an incoming message collection module 30 and an outgoing message collection module 32 disposed therein. Generally speaking, the message collection modules 30 and 32 at each network node 22 receive (view) and analyze each incoming or outgoing message, respectively, and collects or generates metadata regarding some or all of those messages. The metadata may include, but is not limited to, a timestamp of a message, a message length, a length of one or more data fields within the message, the addressee or addressor (e.g., sender and/or receiver), parity information, the type of message (format, for example), etc. Of course, the modules 30 and 32 may generate or collect any other metadata about each message being received at or sent from a network node, and the collection modules 30 and 32 may store the metadata in a temporary or other memory 31 at the network node.

Periodically, at non-periodic times, or in a real-time manner, the message collection modules 30 and 32 of any network node 22 may communicate the collected metadata for that node over the network link 24 to the anomaly detection analysis engine 34 via a communication front end 33 of the node. Generally speaking, as illustrated in FIG. 1, the anomaly detection analysis engine 34 includes an anomaly detection controller 40, an expert or logic engine 42, a rules database or memory 44, a message traffic pattern storage database 46, an alarm or notification engine, also called an alert generator 48, and a metadata storage unit 50. In particular, the detection controller 40 receives the metadata provided from the various message collection modules 30 and 32 of the network nodes 22 via, for example, the network link 24. The detection controller 40 stores this metadata (along with an indication of the network node to which the metadata relates) in the metadata storage unit 50. While it is preferable to use the network link 24 (e.g., the primary network bus or communication channel of the network 20) to effect communications of the collected metadata from the network nodes 22 to the detection engine 34, the anomaly detection engine 34 may be connected to the network nodes 22 via a separate communication link that is dedicated, for example, to providing communications related to the collected metadata to the detection engine 34.

Thus, unlike prior art systems that send the messages themselves to an analysis engine to be analyzed, the anomaly detection system 10 uses the network link 24 to communicate message metadata from the nodes 22 to the detection engine 34, instead of the entire messages. Because the metadata is typically relatively small in size, as compared to the messages themselves, the anomaly detection system 10 generally requires very low network bandwidth or minimal usage of the network link bandwidth. As a result, while the message traffic between the nodes 22 sent over the network link 24 has access to the full bandwidth of the communication link 24, as indicted by the line 60 in FIG. 1, the metadata communications that are performed over the communication or network link 24 generally only require low bandwidth usage of the link 24, as indicated by the line 62 in FIG. 1.

In any event, the controller 40 of the detection engine 34 initiates the expert or logic engine 42 to analyze the collected metadata periodically, continuously, at various preconfigured times, in response to a user request or command, in response to a detected event, etc. During such analysis cycles, the logic engine 42 may analyze the collected metadata from the nodes 22 (as stored in the metadata memory 50) by implementing a set of logic rules stored in the rules database 44, to detect anomalies in the message traffic going into or coming out of each network node 22. In particular, the analysis or logic engine 42 may implement one or more (or all) of the logic rules stored in the rules database 44 based on the stored metadata and one or more traffic pattern parameters stored in the traffic pattern storage database 46.

In a general sense, the traffic pattern parameters stored in the traffic pattern database 46 reflect the expected or normal behavior of the message traffic into and out of the nodes 22 of the network 20. More particularly, the traffic pattern data stored in the traffic pattern database 46 may be generated by collecting and analyzing message or traffic metadata from the nodes 22 of the network 20 during a particular period of time, such when the network 20 is up and running but right after it has been set up, when there is relative certainty that the network is not compromised. During this time, the generated or collected metadata reflects the "normal" or "expected" operation of the network, in a statistical sense. Various traffic pattern parameters or statistics can be collected or generated from the message metadata collected during this time and this data may be stored in the traffic pattern database 46 as a base or reference set of data reflecting the expected or normal operation of the network. The traffic pattern parameters collected or generated and stored in the database 46 may include, for example, statistical measures of the traffic at any particular node or groups of nodes in any granularity. This is, the stored traffic pattern parameters may indicate any statistical measure of data (e.g., mean, standard deviation, average, median, etc.) grouped or performed on any type of data, time frame, node or group nodes, incoming or outgoing, sender receive, length, etc. and may be stored in any desired hierarchy, such as a hierarchy that reflects the configuration hierarchy of the network. The traffic pattern parameters may also include ranges or limits for any types or groups of communications into or out of a node or group of nodes which, when exceeded, will reflect or trigger an anomaly or potential anomaly detection. These ranges or limits may be absolute limits, for example, in the form of a fixed number, or may be relative limits based on or related to other statistical measures, such a three times an average value, falling within the first or second standard deviation, a predetermined amount above or below a median or mean value, etc.

As will be understood, the rules within the rules database 44 are created and are used to define the manner in which the current or collected metadata should be analyzed to detect anomalies in the network. More particularly, the rules in the rules database 44 specify the manner in which the collected metadata should be analyzed, for example, by comparing the collected metadata or statistics about the collected metadata to traffic pattern data stored in the database 46 and/or using traffic pattern limits or ranges as stored in the traffic pattern database 46. In a general sense, the rules engine 42 implements the rules stored in the rules database 44 to compare the collected metadata (e.g., statistics about the collected metadata) to the traffic pattern parameters as stored in the traffic pattern database 46 as baseline data.

Likewise, as indicated in FIG. 1, the detection engine 34 includes an alert generator 48 which may generate one or more alerts, alarms, or messages based on the results of the analyses performed by the rules or logic engine 42. The alerts, alarms or messages created by the alert generator 48 may be sent to any desired personnel, such as operators, security personnel, IT personnel, etc., either via the network link 24 (as shown in FIG. 1) or via any other communication link provided for or used for that purpose. As an example, alerts, alarms or messages may be sent to a designated person's e-mail account, to an operator or security interface that also illustrates other data about the plant, may be sent as a phone call or a text message that is delivered via private or public networks to a designated person or group of people, at any desired device, such as a mobile device, etc. Likewise, these alerts, alarms or messages may be set off alarms or notifications on handheld devices, such as phones, watches, wearable devices, laptops, tablet computers, etc. of any designated person responsible for responding to and investigating potential intrusions into the network 20. In some cases, the alarm or alert generator 48 may operate to limit access to an infected or potentially infected node, may shut down a node, or in very critical situations, may shut down or isolate the communications network 20 itself to limit damage being done to the plant or a subsystem in the plant by the intrusion. Of course, the alert generator 48 may include software or logic that may communicate with other devices in the network 20 to effect such automatic operations. In some cases, the alert generator 20 may ask for authorization from a user before taking such automatic actions in the plant network 20, but in other cases may perform the actions in the network 20 prior to or simultaneously with notifying a user of an intrusion or potential intrusion. Moreover, when taking automatic actions, the alert generator 48 may communicate with the infected or potentially infected node to limit communications from (into and/or out of) that node, for example, to limit or halt particular types of messages from that node, to halt or limit the operation of particular applications at that node (which may be generating the anomalous message traffic), to halt or limit communications via certain ports of a device, etc. Instead, or additionally, the alert generator 48 may communicate with other nodes, such as gateway nodes connected to other networks, to limit or halt messages between the network 20 and other networks. This action may allow the critical operations (such as control operations) to occur on the network 20, while isolating the network 20 from outside sources to prevent, at least temporarily, the anomalous message traffic from leaving or entering the network 20, which may limit data theft, may halt the virus within the network 20 from infecting other networks, may stop further intrusions into the network 20 via the infected node, etc. For example, the alert generator 48 may sever all communications between external business systems and the affected industrial control system network until the anomaly could be assessed by security personnel on site. Of course, the alert generator 48 may be tied into (communicatively connected to) other systems, such as security systems, to perform these functions.

The rules database 44 may store any desired set of rules that are created or generated by one or more security personnel, configuration personnel, users, operators, etc., that define analyses to be performed on the message traffic or message metadata received from the communications network nodes 22 to determine if there is an anomaly in the message traffic or traffic patterns, and thus if an alert or alarm should be generated. The rules engine 42 may also execute these rules to compare current message or traffic metadata to a set of standard or baseline data that is collected by the collection modules 30 and 32 at the various nodes 22 of the network 20 during a time when the system is first set-up or configured, and when it is thus known or likely that no intrusion or malware is present in the network 20. This stored message or traffic pattern metadata is referred to herein as a baseline set of metadata which defines a "normal" operation of the network or network nodes. The rules employed by the rules engine 42 may thus operate to compare the metadata collected from a node or a group of nodes to the standard or baseline metadata for the node or group of nodes to determine if there are significant differences therebetween, as defined by other traffic pattern parameters, such a limits or difference variables, stored in the traffic pattern database 46. A significant or statistically relevant difference, as determined by the logic rules in the rules database 44, may indicate an intrusion into the network 20 or at the node 22 thereof. If such a difference is detected, then the controller 40 may cause the alert generator 48 to generate an alert or an alarm. The type of alert or alarm, the recipient(s) of such alarms, and other parameters of the alerts or alarms (e.g., priority, etc.) may be configured based on the type of detected difference between the current message traffic and the baseline message traffic, the severity of the difference, etc.

It will be understood that any desired types of metadata may be created or obtained for the messages or traffic at the nodes 22 and that the rules in the rules database 44 may be created for analyzing the metadata in the analysis engine 34 in any desired manner using this metadata or statistics about this metadata. For example, the metadata may include general information or statistics about (1) messages, such as message counts, and message count statistics, e.g., minimums, maximums, averages, etc.; (2) connection information and statistics, e.g., sources (such as configured versus nonconfigured nodes, source ports, etc.), addresses (such as source and destination addresses and ports), scope (such as unicast, multicast, broadcast), payload type (such as TCP, UDP, other), and timing (such as time of day, relative time, rate of attempts, etc.); (3) communications information, e.g., message timing (such as rates, times of day, sequence errors, etc.), security errors (such as failed integrity, authentication, or decryption), message content (such as size, format errors, etc.); and (4) spurious information, e.g., rate limiting info (such as state, method, rate of limiting, etc.), and connection attempts (such as out of sequence, malformed, sweeps, etc.) Of course any other types of message metadata may be obtained and used as well or instead, and it will be understood that the list provided herein is not comprehensive.

Moreover, message metadata may be collected and stored based on other factors or parameters within the network or nodes, such as the roles of the sending or receiving nodes (e.g., whether these nodes are workstations, servers, gateways, controllers, I/O servers, remote terminal units (RTUs), etc.) Thus, it will be understood that message and traffic metadata may be created at or for various different hierarchical levels of the network, such as on a device or node basis, a device or node role basis, a message basis, etc., or relative to any other hierarchical level of the network. Still further, the configuration information of the control or communications network 20 may be used to initially create or to modify rules for analyzing traffic metadata, or to organize the metadata analysis. Generally speaking, the configuration information for the network includes information regarding the number of applications, modules, control routines, etc. at each of the nodes (devices) and the manner in which these various logical elements, software elements and hardware elements communicate with one another, including communication pairs (sender/receiver pairs), communication timings, frequencies, types of messages, control system role or device type, etc. This configuration information may be used to create or modify the rules that are used to analyze the traffic metadata from any of the nodes. That is, the configuration information, including the configuration hierarchy information (e.g., what devices and modules are related to what other modules and devices in the network) may be used to create modify or fill out parameters of rules for analyzing message metadata. As an example, the configuration information may be used to, for example, select a subset (i.e., a profile) of the generalized rules for analyzing traffic metadata. The configuration information may also be used to plug in specific values within one or more generalized rule parameters (e.g., where a rule has a placeholder for <subscribers>, the configuration information could be used to fill in the address and port information for the specific subscribers listed in the configuration). In this manner, the effective logic rules can be tailored from a larger set of general rules to a subset of specific rules based on the control system configuration of a device or node.

Still further, as illustrated in FIG. 1., the anomaly detection system 10 includes a network configuration change module 70 that may be, for example, stored in a network configuration database or server device 72. Generally speaking, the configuration change module 70 operates to detect changes in the network configuration for the communications network 20 and then sends these changes and/or notifications of these changes to the detection engine 34 via, for example, the network link 24. As used herein, a configuration change may include any change made to the operation of a device or set of devices on the network, including the addition of new devices, applications, modules, etc.; the removal of any devices, applications, modules, etc.; and the change in device, application, module, etc., parameters, settings or other configurations, (including changing of any hardware, software or firmware setting), including changing communication and process control settings, such as, for example, changing a recipe used in, for example, a batch process, etc. In this case, whenever a configuration engineer or other user changes the network configuration by, for example, adding new applications or modules to the network, changing the manner in which applications or modules in the network communicate with one another, etc., the network configuration change module 70 detects such a change and sends a notification to the detection engine 34 informing the controller 40 of the change in the network configuration. Of course, while the change module 70 is illustrated as being located in the configuration database 72, the configuration module 70 can be located in any device or computer (such as an operator interface device or a server) that has access to or that implements a configuration application (that changes or enables a user to change the configuration of the network 20) or that otherwise is notified of configuration changes, and may operate in any desired manner to detect network configuration changes.

In any event, whenever a change is made to the configuration of the network 20 (e.g., effecting the addition, deletion or changing of communication aspects of any software, function blocks, modules, etc. in any of the devices on the network 20 or tied to the network 20), the change detection module 70 may send a notification to the analysis engine 34 to inform the analysis engine 34 to expect changes or potential changes in network traffic patterns or specifics. This notification may enable the analysis engine 34 to avoid false positives (e.g., detecting an intrusion) when the change in traffic patterns are due to changes in the network configuration instead of an actual intrusion.

Moreover, upon the detection of a network configuration change, the controller 40 may run or implement a procedure that collects metadata from the network nodes 22 (after the change in the configuration), and that uses that newly collected metadata to generate a new set of baseline metadata or baseline metadata statistics to be stored in traffic pattern database 46. The new set of baseline metadata may then be used to detect future anomalies in the traffic patterns based on the configured state of the network. Still further, in some cases, the controller 40 may also or instead change the rules stored in the rules database 44 and/or may change limits or other parameters stored in the traffic pattern database 46 based on the new configuration of the network, to enable the anomaly detection system 10 to better operate in view of the new or changed network configuration.

Thus, as will be understood, a change in the network configuration may change the network traffic patterns by, for example, increasing or decreasing network traffic, changing specific types of network communications (e.g., by changing the properties of or amounts of certain types of communications between various devices on the network 22 or between applications run within the various devices at the nodes 22 of network 20). In any event, a change in the network configuration may cause the baseline metadata and metadata statistics that have been developed and stored for the baseline network configuration to be incorrect. In these circumstances, the controller 40 of the detection engine 34 may begin to collect new network traffic metadata under the new configuration, determine statistical or other data about network traffic based on the metadata and store that data in the baseline database 46 as new baseline metadata. In some circumstances, it may be desirable to change, add or delete rules in the rules database as a result of the new configuration to, for example, tailor the rules to the new configuration, such as by implementing a profile plug-in within one or more rules of the rule database to match or reflect parameters of the new configuration. For example, new types of communications may be added by the new configuration and a rule may be updated with a profile plug-in based on the new communication, and this rule may then be used to analyze the metadata associated with these new types of communications based on the new senders and/or receivers of the communications.

In any event, after creating a new set of baseline statistical data, the rules engine 42 may then begin to actively detect intrusions based on the new baseline statistical data and rules stored in the rules database 44. As will be understood, the use of the configuration change detection module 70 may reduce or limit false positives (i.e., incorrect detections of intrusions) caused by a change in the network configuration. Moreover, the configuration change detection module 70 may be used to retune the anomaly detection engine 10 when the network is reconfigured, thereby enabling the anomaly detection engine 10 to operate correctly even after network configuration changes.

As will be seen, the anomaly detection system 10 of FIG. 1 distributes the data collection processing workload across network nodes 22 and thus does not require a large amount of processing power at the various nodes 22. Moreover, this system reduces the network node and anomaly detection analysis workload through knowledge of the system network configuration and reports metadata about network traffic for analysis instead of requiring separate monitoring networks. Still further, this system reduces the false positive rate of the anomaly detection analysis through notifications of authorized network configuration changes or automated reconfiguration (e.g. due to high availability mechanisms) and may use the same data to perform multiple types of anomaly analysis (e.g. security or maintenance). Still further, this system may enable hierarchical analysis/reporting to performed on any network node in a plant control or industrial control system through any combination of predefined rules and machine learning.

Still further, the anomaly detection system 10 may use the plant network configuration at network nodes to reduce the metadata collection workload, may use the known system network configuration at the analysis engine 34 to define the set of rules, and to seed the learning process for the analysis engine 34, and may report only metadata about the network traffic seen by network nodes (versus reporting full copies of network frames, logs, or only SNMP alerts). Likewise, the anomaly detection system 10 may use system network configuration change notifications to reduce the false positive rate of the anomaly detection analysis or to reclassify the resultant notification, and may perform metadata gathering and/or analysis at network infrastructure devices (e.g. switches, routers, firewalls) versus centralized servers/appliances. Still further, this system 10 may perform metadata gathering and/or analysis at endpoint devices (e.g. controllers, RTUs, I/O servers, workstations, servers) versus centralized servers/appliances.

In some cases, the anomaly detection system 10 may perform the metadata gathering and/or analysis using an FPGA, TCP offload engine, or other programmable hardware, and may perform hierarchical metadata gathering within a network node 22 or across network nodes. Likewise, the anomaly detection system 10 may perform metadata gathering based on outbound traffic and/or analysis at endpoint devices (e.g., controllers, RTUs, I/O servers, workstations, servers) versus centralized servers/appliances, and may perform metadata gathering based on the absence of traffic and/or analysis at endpoint devices (e.g., controllers, RTUs, I/O servers, workstations, servers) based on the system network configuration. Moreover, in some cases, if desired, the anomaly detection system 10 can be set up to tap all network switches for access to all of the network traffic passing through the switches. However, this configuration does not scale to multi-tier switch topologies well because this configuration limits the maximum capacity of each switch and requires additional cabling/networks to be run just for the monitoring traffic.

Figure 2:
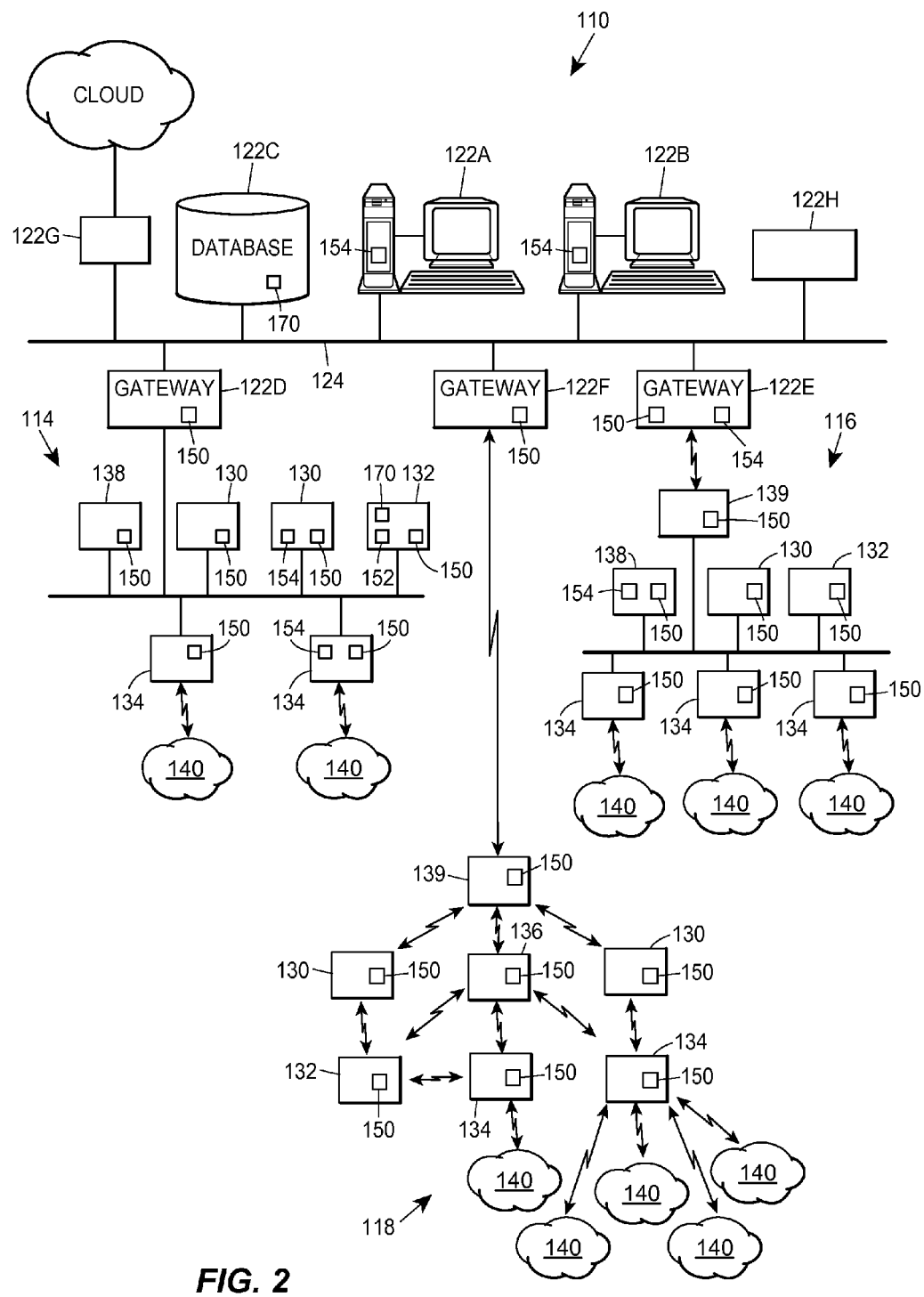
FIG. 2 is an exemplary block diagram of a process or industrial plant having multiple interconnected communications networks in which one or more network anomaly detection systems, such as that of FIG. 1, can be implemented.
Figure 3:
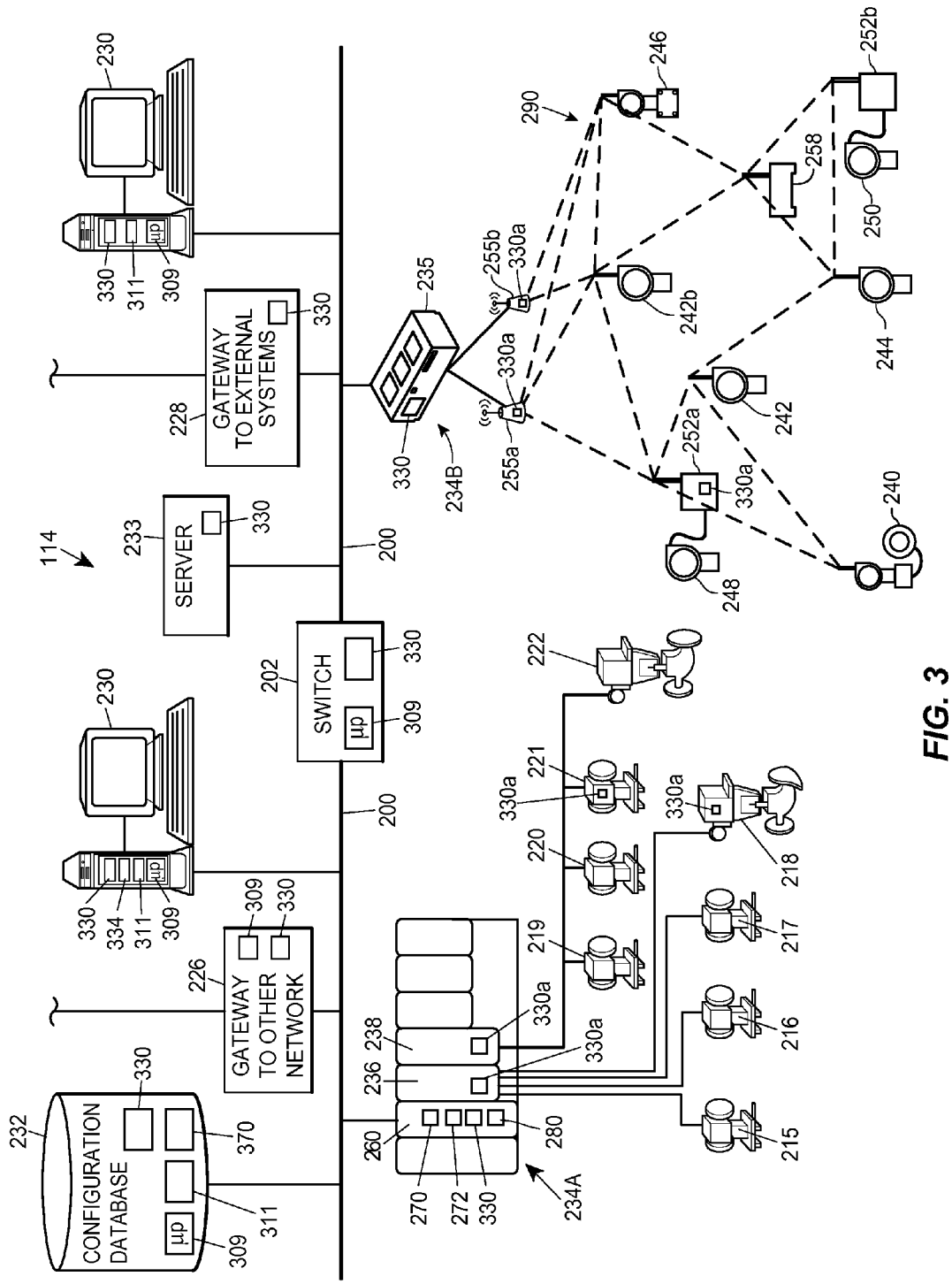
FIG. 3 is an exemplary diagram of one of the plant networks of FIG. 2, in the form of a distributed process control system and process automation network, having various nodes including operator and maintenance workstations, servers, and controller nodes, in which an anomaly detection system of FIG. 1 operates to detect potentially infected or compromised nodes.

By way of example, FIGS. 2 and 3 illustrate example plant networks in which the anomaly detection system 10 of FIG. 1 can be installed and used. In particular, FIG. 2 illustrates a plant or industrial communications system 110 including a number of different but interconnected communications networks 112, 114, 116 and 118, each having various network nodes. In particular, the communications network 112 of FIG. 2 may be a business communications network including multiple nodes 122A-122H interconnected by a communications bus 124 which may be, for example, an Ethernet bus or any other wired or wireless communications bus or network. The nodes 122A, 122B may include, for example, computers, servers, workstations, etc. at which business applications or programs are run, and the node 122C may be, for example, a database that stores business data, industrial plant configuration data, or any other desired data regarding the plant 110. Likewise, the nodes 122D, 122E and 122F may be gateway nodes that connect the network 112 to the other communications networks 114, 116, 118, respectively, and to allow inter-network communications. Likewise, a node 122G may be a gateway node that connects the network 112 to the internet, the cloud, or other wide area network to enable the network 112 to communicate with remote servers, plants, or other computers.

In this example, the networks 114, 116 and 118 are plant (such a process plant or industrial plant) control networks that include various nodes interconnected by a wired or a wireless communication bus or network link. Each of the plant control networks 114, 116, 118 may include any of various types of devices at the nodes thereof. For example, the plant control networks 114 and 116 are wired communications networks that each includes one or more user interface devices 130, a database or historian 132 which may store' plant control network configuration data for the networks 114 and/or 116, one or more process controller nodes 134 interconnected via a communications bus 136, in this case in the form of an Ethernet communications bus, and one or more server or processor nodes 138. The process control nodes 134 may include one or more process controllers communicatively coupled to other devices such as I/O and field devices (e.g., sensors, valves, controlled devices, etc.) via one or more wired or wireless sub-networks 140. The field devices in the sub-networks 140 may take the form of, for example, valves, sensors, transmitters or other measurement or control devices that measure some parameter or process variable in the plant, or that perform some physical control action related to material operation or material flow within the plant. The field device sub-networks 140 may, for example, use any desired process control communication protocol or paradigm, such as the Highway Addressable Remote Transmitter (HART®) protocol, the FOUNDATION® Fieldbus protocol, the Profibus protocol, the CAN protocol, etc. Still further, the field device sub-networks 140 may be implemented as wired or wireless networks, such as WirelessHART® network. The networks 114 and 116 may also include gateway devices at the nodes 122D, 122F that connect the networks 114 and 116 to the network 112, to the internet or other WANs, etc. Of course, these gateway devices may provide firewall and other security features or applications.

In a similar manner, the communications network 118 is illustrated as a wireless communications network that may use a wireless communication protocol such as a wireless Ethernet protocol, the WirelessHART® protocol, the ISA100 wireless protocol, etc. The communications network 118 is illustrated as including various devices, such as user interface devices or workstations 130, databases 132, process controllers 134, servers 136, field device sub-networks 140, gateway devices 139, etc. Of course, any number of these and other types of devices may be located at the various nodes of the communications networks 114, 116 and 118. It will be understood that any or all of network devices within the networks 112, 114, 116, 118 may include one or more computer readable memories and processors on which various software modules, including any of the modules associated with the anomaly detection system 10 described herein, may be stored and executed.

Importantly, an anomaly detection system 10 described with respect to FIG. 1 may be implemented in any and all of the networks 112, 114, 116 and 118 of FIG. 2 to detect intrusions into these networks in the form of, for example, malware or other unauthorized applications running in these networks. Generally speaking there may be a separate anomaly detection system for each of the networks 112, 114, 116 and 118, but, in some cases, a single anomaly detection system may be used to cover multiple ones of the networks 112-118, such as the networks 114 and 116 or the networks 112 and 114, etc. Likewise, components for the anomaly detection system of one network, such as the network 118, may be stored in devices in another one of the networks, such as in the network 112.

As an example, as generally illustrated in networks 114, 116, and 118 of FIG. 2, an anomaly detection system for each of these nodes may include a collections application 150 (which may include the message collection blocks 30 and 32 of FIG. 1) located at each of the network nodes (or at least at some of the network nodes) of the communications networks 114, 116, 118, and may include an analysis engine 154 (which may be the detection engine 34 of FIG. 1) located at one of the nodes of the networks 114, 116 and 118 of which the anomaly detection system is configured to protect. In the case of the network 118, the analysis engine 154 is illustrated as being located in a node of the network 112, e.g., at the workstation 122A, to illustrate that components of an anomaly detection system for a particular network may be located in a device outside of that network.

Generally speaking, each of the collection applications or modules 150 observes or analyzes network message traffic that is generated at and sent out over the network link at a node and/or message traffic that is received at (sent to) the network node, and these collection applications or modules 150 generate metadata about that message traffic. The collection applications 150 generally operate independently at each node of a network to collect network traffic metadata at each node and to then send the metadata to the analysis engine 154 for that network, wherein the analysis engine 154 analyzes this metadata to determine anomalies in network traffic patterns. These detected anomalies may then be used to detect potential or actual intrusions into the network, including malware, spy programs, etc. If desired, the collection applications 150 may send the metadata regarding the message traffic at (into and out of) a network node over the network itself, or using a standalone, separate or parallel communications network if so desired. However, because generally only the metadata pertaining to message traffic needs to be sent to the analysis engine 154, instead of the messages themselves, the communications between the data collections applications 150 and the respective analysis engine 154 does not significantly add to the traffic load of the network link. In addition, while the data collection applications 150 may send metadata in real time, they may preferably store this metadata and send batches of metadata to the respective analysis engine 154 periodically, whenever a certain amount of metadata for a node has been collected, at specified times, in response to specified events, etc., to thereby reduce network traffic caused by communications between the data collection applications 150 and the analysis engines 154. For the sake of illustration, a set of configuration change detection modules 170 are also illustrated in the various networks 112, 114, 116, 118 and these modules operate in the manner described above to alert a respective analysis engine 154 of a configuration change in a respective network.

Likewise, again for the sake of illustration, FIG. 2 illustrates an anomaly detection system for the network 114 being completely disposed within the network 114 (i.e., within devices connected directly to the network link of the network 114), while the anomaly detection system for the network 118 includes elements (e.g., the collection modules 150) disposed in devices in the network 118 while the analysis engine 154 (in the node 122A) and the configuration change detection module 170 (in the node 122C) for this network are disposed and executed in devices in another network (the network 112) to which the network 118 is communicatively coupled. In this manner, the message collection modules 150 send metadata for the network 118 to an analysis application 154 for the network 118 that is actually implemented in a device outside of the network 118 (e.g., in the device at the node 122A of the network 112). Still further, while not shown particularly, a single analysis engine 154 may be used to detect traffic anomalies within multiple or across multiple networks. For example, the analysis engine 154 in the device at the node 122A of the network 112 may operate to receive metadata from devices in the networks 112 and 116, in the networks 118 and 116 or in the networks 112, 116 and 118. In this case, the same analysis engine 154 would receive change notifications from one or more configuration change detection modules 170 which may be located in devices in one of the networks 112, 116 or 118 or even in other networks, depending on where, for example, the configuration databases for these networks are located. Thus, a single anomaly detection system may be used to detect message or traffic anomalies in a single network or across multiple networks. Moreover, while the anomaly detection system has been described as having a single anomaly detection engine 154 for each network, the same anomaly detection system could have multiple detection engines 154 in, for example, different devices of a network. Such a configuration could reduce processing power needs of any particular engine 154, provide for distributed processing, etc.

As a further example, FIG. 3 illustrates the communications network 114 of FIG. 2 in more detail. In this example, the communications network 114 includes a wired Ethernet bus 200 which may include one or more switches 202 that interconnect various devices such as a gateway to other networks 226, a gateway to external systems 228, such as to the internet, one more user interface devices or workstations 230, a configuration database 232, a server 23, and two process control nodes 234A and 234B. Here, the first process control node 234A includes one or more redundant process controllers 260 that is/are communicatively connected to wired field devices 215-222 via input/output (I/O) cards 226 and 228, and is communicatively connected to wireless field devices 240-258 via a wireless gateway 235 and the network backbone 200. In this case, the wireless gateway 235 is the second control node 234B of the network 114. In another embodiment, though, the controller 260 at the node 234A may be communicatively connected to the wireless gateway 235 using a communications network other than the backbone 200, such as by using another wired or a wireless communication link or I/O module.

The controller 260, which may be, by way of example, a DeltaV controller sold by Emerson Process Management, may operate to implement one or more batch processes or continuous processes, maintenance applications, safety system applications, etc. using at least some of the field devices 215-222 and 240-258. The controller 260 may be communicatively connected to the field devices 215-222 and 240-258 using any desired hardware and software associated with, for example, standard 4-20 ma devices, input/output (I/O) cards 236, 238, and/or any smart communication protocol such as the FOUNDATION® Fieldbus protocol, the HART® protocol, the WirelessHART® protocol, etc. The controller 260 may additionally or alternatively be communicatively connected with at least some of the field devices 215-222 and 240-258 via other connections. In the network 114 illustrated in FIG. 3, the controller 260, the field devices 215-222 and the I/O cards 236, 238 are wired devices, and the field devices 240-258 are wireless field devices. Of course, the wired field devices 215-222 and wireless field devices 240-258 could conform to any other desired standard(s) or protocols, such as any wired or wireless protocols, including any standards or protocols developed in the future.

The controller 260 of FIG. 3 includes a processor 270 that implements or oversees one or more process control routines (stored in a memory 272), which may include control loops. The processor 270 may communicate with the field devices 215-222 and 240-258 and with other nodes that are communicatively connected to the backbone 200 in order to perform control activities, or other activities such as maintenance, monitoring and safety system activities. It should be noted that any of the control routines or modules described herein may have parts thereof implemented or executed by different controllers or other devices if so desired. Likewise, the control routines or modules described herein which are to be implemented within the process control system may take any form, including software, firmware, hardware, etc. Control routines may be implemented in any desired software format, such as using object oriented programming, ladder logic, sequential function charts, function block diagrams, or using any other software programming language or design paradigm. The control routines may be stored in any desired type of memory, such as random access memory (RAM), or read only memory (ROM). Likewise, the control routines may be hard-coded into, for example, one or more EPROMs, EEPROMs, application specific integrated circuits (ASICs), or any other hardware or firmware elements. Thus, the controller 260 may be configured to implement a control strategy or control routine in any desired manner.

In some embodiments, the controller 260 implements a control strategy using what are commonly referred to as function blocks, wherein each function block is an object or other part (e.g., a subroutine) of an overall control routine and operates in conjunction with other function blocks (via communications called links) to implement process control loops within the process control system. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system. Of course, hybrid and other types of function blocks exist. Function blocks may be stored in and executed by the controller 260, which is typically the case when these function blocks are used for, or are associated with standard 4-20 ma devices and some types of smart field devices such as HART devices, or may be stored in and implemented by the field devices themselves, which can be the case with Fieldbus devices. The controller 260 may include one or more control routines 280 that may implement one or more control loops. Each control loop is typically referred to as a control module, and may be performed by executing one or more of the function blocks.

The wired field devices 215-222 may be any types of devices, such as sensors, valves, transmitters, positioners, etc., while the I/O cards 236 and 238 may be any types of I/O devices conforming to any desired communication or controller protocol. In the embodiment illustrated in FIG. 3, the field devices 215-218 are standard 4-20 ma devices or HART devices that communicate over analog lines or combined analog and digital lines to the I/O card 236, while the field devices 219-222 are smart devices, such as FOUNDATION® Fieldbus field devices, that communicate over a digital bus to the I/O card 238 using a Fieldbus communications protocol. In some embodiments, though, at least some of the wired field devices 215-222 and/or at least some of the I/O cards 236, 238 may communicate with the controller 260 using a big data network. In some embodiments, at least some of the wired field devices 215-222 and/or at least some of the I/O cards 236, 238 may be nodes of the process control system network 114.

In the embodiment illustrated in FIG. 3, the wireless field devices 240-258 communicate in a wireless network 290 using a wireless protocol, such as the WirelessHART® protocol. Such wireless field devices 240-258 may directly communicate with one or more other nodes of the network 114 that are also configured to communicate wirelessly (using the wireless protocol, for example). To communicate with one or more other nodes that are not configured to communicate wirelessly, the wireless field devices 140-158 may utilize the wireless gateway 235 connected to the communications backbone 200 or to another process control communications network. In some embodiments, at least some of the wireless field devices 240-258 may be nodes of the process control system network 114.

The wireless gateway 235 provides communicative coupling between the wireless devices 240-258, the wired devices 215-222, and/or other nodes of the process control network 114. The wireless gateway 235 provides communicative coupling, in some cases, by the using routing, buffering, and timing services in lower layers of the wired and wireless protocol stacks (e.g., address conversion, routing, packet segmentation, prioritization, etc.) while tunneling a shared layer or layers of the wired and wireless protocol stacks. In other cases, the wireless gateway 235 may translate commands between wired and wireless protocols that do not share any protocol layers. In addition to protocol and command conversion, the wireless gateway 235 may provide synchronized clocking used by time slots and superframes (sets of communication time slots spaced equally in time) of a scheduling scheme associated with the wireless protocol implemented in the wireless network 290. Furthermore, the wireless gateway 235 may provide network management and administrative functions for the wireless network 290, such as resource management, performance adjustments, network fault mitigation, monitoring traffic, security, and the like.

Similar to the wired field devices 215-222, the wireless field devices 240-258 of the wireless network 290 may perform physical control functions within the process plant, e.g., opening or closing valves or take measurements of process parameters, or perform other functions. The wireless field devices 240-258, however, are configured to communicate using the wireless protocol of the network 290. As such, the wireless field devices 240-258, the wireless gateway 235, and other wireless nodes of the wireless network 290 are typically producers and consumers of wireless communication packets.

In some scenarios, the wireless network 290 may include non-wireless devices. For example, a field device 248 of FIG. 3 may be a legacy 4-20 mA device and a field device 250 may be a traditional wired HART device. To communicate within the network 290, the field devices 248 and 250 may be connected to the wireless communications network 290 via a wireless adaptor (WA) 252a or 252b. Additionally, the wireless adaptors 252a, 252b may support other communication protocols such as FOUNDATION® Fieldbus, PROFIBUS, DeviceNet, etc. Furthermore, the wireless network 290 may include one or more network access points 255a, 255b, which may be separate physical devices in wired communication with the wireless gateway 235 or may be provided within the wireless gateway 235 as an integral device. The wireless network 290 may also include one or more routers 258 to forward packets from one wireless device to another wireless device within the wireless communications network 290. The wireless devices 240-258 may communicate with each other and with the wireless gateway 235 over wireless links of the wireless communications network 290 illustrated by dotted lines in FIG. 3.

Although the network 114 of FIG. 3 only illustrates a single controller 260 with a finite number of field devices 215-222 and 240-258, this is only an illustrative and non-limiting embodiment. Any number of controllers may be included on the network 114, and the controller 260 may communicate with any number of wired or wireless field devices 215-222, 240-258 to, for example, control a process in the plant. Furthermore, the process plant may also include any number of wireless gateways 235, routers 258, access points 255, and wireless process control communications networks 290.

Generally speaking, a threat detection system may be installed or implemented in the network 114 in any desired manner following the disclosure of FIG. 1. In particular, as illustrated in FIG. 3, the anomaly detection system 10 includes communication modules 330 (which may be the communication modules 30 and 32 of FIG. 1), disposed in each of the network nodes 226, 228, 230, 232, 233, 234A, 234B, and 235 and in any of the switches 202 or other endpoint devices of the network 114. While not shown in full detail in FIG. 3, the communication modules 330 may be installed in any of the sub-node devices, such as in the I/O devices 236 and 238, in or all of the wired field devices 215-222 or in any or all of the wireless devices 240-258. In FIG. 3, each of the communication modules 330 in a sub-node device is labeled with the reference number 330a to show that it is in a sub-node of a larger node of the network 114. As indicated with respect to FIG. 1, the communication modules 330 and 330a analyze traffic into and out of each of the nodes and compile metadata about the traffic.

In this example system, the communication modules 230 and 230a communicate over the network link 200 to an anomaly detection engine 334 which is illustrated as being installed in one of the user interface devices 230. However, the anomaly detection engine 334 may be installed in any of the other computer devices on the network 114, such as in the configuration database 232, the gateway devices 226, 228, the switches 202, etc. on the network. Moreover, the anomaly detection engine 334 may be disposed in a computer device outside of the network 114, such as in one of the networks 112, 116, 118 of FIG. 2. In this case, the metadata collected at the various nodes or sub-nodes of the network 114 may be communicated via the network link 200 and one of the gateway devices 226, 228 (which may or may not include a firewall) to another network. Additionally, communications from the sub-network devices, such as the field devices 215-222, I/O devices 236, 238 and wireless field devices 240-258 may be sent up to a primary network node device, such as the controller 260 or the gateway device 235, and these devices may then forward those communications to the detection engine 334. Still further, as illustrated in FIG. 3, the configuration database 232 includes a configuration change module 370 which detects and communicates configuration changes to the detection engine 234 in any desired manner. As is illustrated in at least some of the nodes of FIG. 3, each of the node devices includes a processor 309, which may be a micro-processor, an ASIC, or other processor that implements and executes the various anomaly detection system modules 330, 334 and 370 and includes a computer readable memory 311 that stores these modules for execution on the processor 309.

Figure 4:
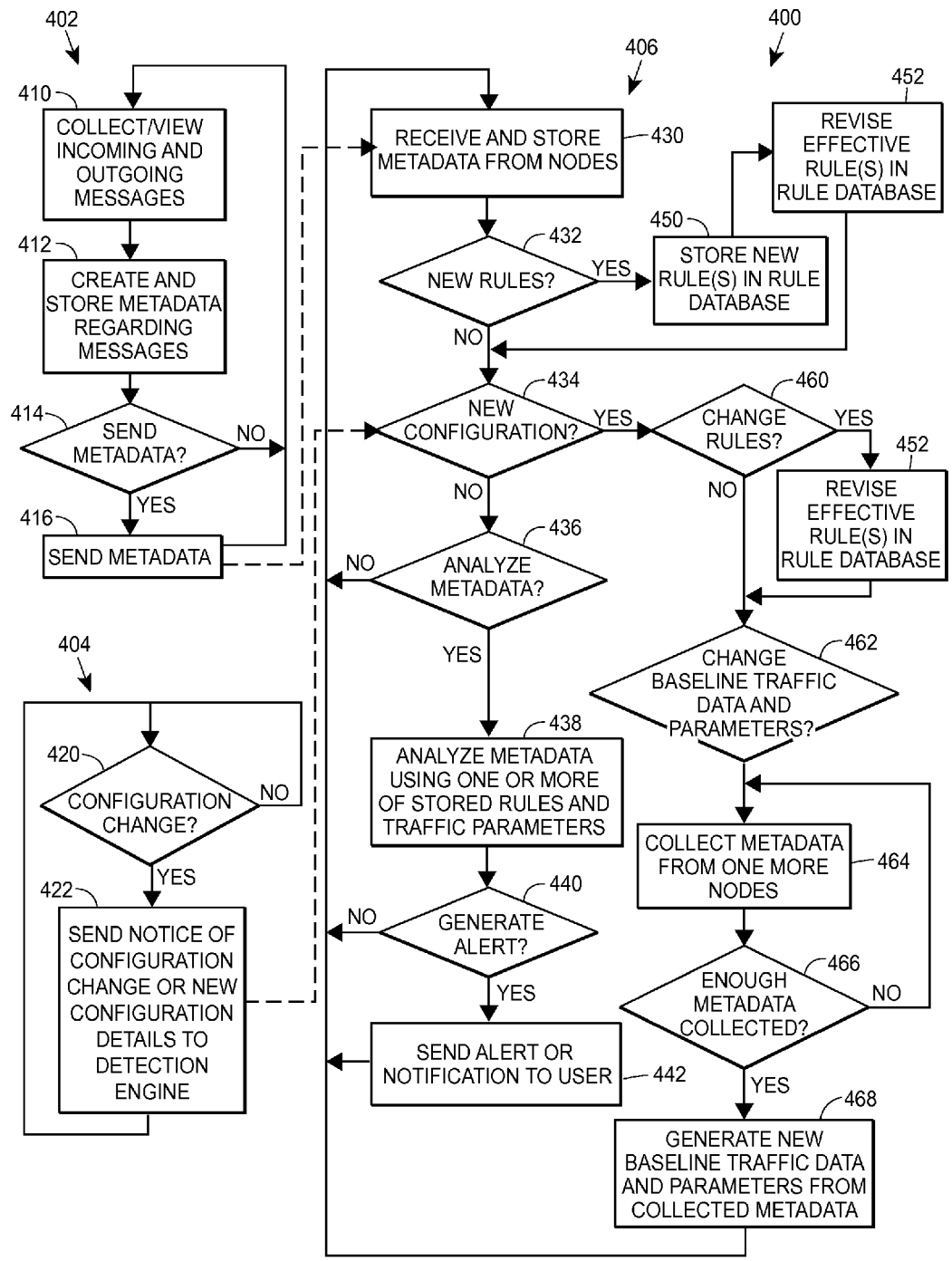
FIG. 4 depicts a flow diagram illustrating communication flow between and processing performed at various components of an example anomaly detection system described herein.

FIG. 4 depicts an example flow diagram illustrating the communication flow between, and the processing at various nodes of a communications network that implements an example anomaly detection system as described herein. In particular, a routine 400 includes various different components which may be implemented in different devices of or on a network, including a component 402, which may be implemented in each of the devices or network nodes in which message traffic metadata is being generated and collected, a component 404, which can be stored along with and implemented in or as part of a configuration module, a configuration database or other configuration routine to detect configuration changes being made to the configuration of a node, and a component 406, which may be used in the expert or anomaly detection engine for detecting anomalies in the network being analyzed.

The component or routine 402 includes a first block 410, which collects and views incoming messages and outgoing messages at a node and which may be located in or operable in conjunction with the communication layer of the node so that it has access to all of the messages coming in and going out of the node. The block 410, which may be implement the blocks 30 and 31 of FIG. 1, to view the messages and to store the messages at least temporarily. After collecting a message, a block 412 creates and stores metadata regarding the message, including any of the metadata described herein or any other metadata that is requested or needed by the analysis engine. Of course the specific nature of the metadata that is collected and generated can be changed from time to time, based on the configuration of the rules that are stored in the rule engine. Next, a block 414 determines if it is time to send the metadata to the analysis engine, which may occur periodically, in response to a user request, when a certain amount of metadata has been created or stored, when a certain amount of messages have been analyzed, etc. If the metadata does not need to be sent, the block 414 transfers control to the block 410. However, if the metadata needs to be sent, a block 416 sends the stored metadata to the analysis engine or anomaly-detection engine in whichever node that engine is located. The block 416 may also send specifics about the node the generated the metadata and other contextual information that may be used by the analysis engine. While the block 416 may send this metadata over the communication link or bus of the network, or via a separate external communications network, in the cases in which the routine 402 is in the same device as the analysis engine, the communications may take place via inter-device communications. The metadata is shown as being sent from the block 416 to the network analysis routine 406 in the anomaly detection engine by a dotted line in FIG. 4.

Of course, the routine 402 continues to operate at each node of the network continuously during operation of the network to analyze all of the ingoing and outgoing messages and to create and store metadata and send that metadata to the anomaly detection engine when necessary.

A routine 404, which may operate in a configuration database or a configuration routine that makes configuration changes to the network configuration, includes a block 420 that detects whether there has been a configuration change and, if not, loops back on itself and continues to analyze when a configuration change is made. When a configuration change is made, such as when one is stored in the configuration database, when one is generated by a configuration routine and downloaded to the network, when a new configuration or configuration change is downloaded to a configuration database, etc., a block 422 sends the notice of a configuration change and/or sends new configuration details or even the entire new configuration to the detection engine as indicated by the dotted line from the block 422. This communication may occur over the network link, if desired. Of course, the routine 404 continues to operate to detect configuration changes and to send notifications of those changes as well as configuration change details, if needed, to the anomaly detection engine, which implements the routine 406.

As illustrated in FIG. 4, routine 406 includes a block 430, which receives and stores metadata from the various nodes and which stores the metadata in memory, such as the metadata memory 50 of FIG. 1, for later analysis. The metadata may be received and stored in any desired manner using any kind of desired communications, and additionally may be stored using any desired database storage routine and/or system. The metadata may be stored based on the node from which it comes, as well as in a manner that cross references the particular types, sources, etc. of the metadata. This metadata may be, for example, stored in a relational database to be able to be accessed in many different manner, based on the type of metadata being stored, the parameters of the metadata, the source of the metadata, the time, etc.

In any event, during execution, a block 432 determines if there are any new rules (including changed rules) that have been created for use by the anomaly detection engine. Such new rules may come from, for example, a user who may be changing rules in the anomaly detection engine or from a security personnel who may download new rules, change rules or reconfigure parameters or limits used by the current rules. If new or changed rules or limit data have been obtained, the block 432 provides control to the block 450, which then stores the new rules in the rule database of the anomaly detection engine, such as the a rule database 44 of FIG. 1, and/or stores new limit or parameter data in the traffic pattern database 46 of FIG. 1. In addition, a block 452 revises the effective rules in the rules database based on or to implement any rule changes. In any event, if no new rules or rule changes are detected, or after the new rules or data have been saved, a block 434 determines if any new configuration has been stored and/or saved in the network as indicted by the configuration change routine 404. If a new configuration or configuration change has not been detected, the anomaly detection system may operate according to the current set of rules, and the current set of traffic parameter data, and control is provided to a block 436. The block 436 determines if it is time to process the metadata currently stored in the metadata database. For example, the block 436 may determine that it needs to process metadata periodically, such as once a second, once a minute, once an hour, etc., or at any other time frame, or may do so in response to a user request, or in response to some predetermined event occurring, such as an alarm being generated. In any event, if it is not time to process the metadata, the block 436 returns control back to the block 430 for the next iteration of the anomaly detection routine 406.

However, if block 436 determines that it is time to process the metadata, a block 438 then analyzes the metadata using one or more of the stored rules in rule database 44 of FIG. 1 and the baseline metadata and traffic parameters stored in the traffic parameter database 46 of FIG. 1. The block 438, which can be implemented by the rules engine 42 of FIG. 1, can analyze or process the logic rules in any desired manner. Upon analyzing all of the metadata or some portion of the metadata in one or more of the rules or all of the rules, a block 440 then determines whether it is necessary to generate an alert if, for example, a potential anomaly has been detected based on the operation of the rules in the rule database. If so, a block 442 then actually sends an alert based on the type of anomaly detected or other information to a user who might be designated in any manner based on the type of anomaly that is detected or based on the specifics of the rules that have been violated based on the anomaly detection analysis. The block 442 may send an alert to one or more users based on their identity or based on a preconfigured list of what user should get what types of anomaly detections. Additionally, the block 442 may induce or initiate automatic actions, such as shutting down the network, sending a message to the node for which an anomaly has been detected to disconnect itself from the network, to shut down certain applications within the node, etc. Control is then returned to the block 430 for a new cycle or iteration of the routine 406.

When the block 434 determines that a new configuration change has been made, a block 460 determines whether it needs to change a set of rules based on the configuration change. If so, a block 452 then changes the effective rules as stored in the rules database, either automatically or in response to user input and stores the new or changed rules in the rule database (e.g., the database 44 of FIG. 1). In either event, a block 462 determines whether it is necessary, based on the configuration change, to change the baseline traffic data parameters because, for example, the configuration may alter the expected operation of the network in terms of traffic flow into or out of a particular node or the network as a whole. If so, a block 464 collects metadata from one or more nodes for a predetermined period of time, and a block 466 determines if enough metadata is collected over that period of time. If not, control returns to the block 464, which continues to collect metadata from the nodes under the new configuration. When the block 466 detects that enough metadata has been collected, a block 468 then generates new baseline traffic data parameters from the collected metadata by, for example, compiling new statistics about the metadata or processing the metadata in any other desired manner. At the end of the process, control is provided back to the block 430 for operation of the anomaly detection using the rules and the new traffic data parameters as determined from the operation of the network under the new configuration.

As will be understood, the anomaly detection system described herein uses the system network configuration at network nodes to reduce the metadata collection workload, uses the known system network configuration at the analysis engine to define the set of rules, and to seed the learning process for the analysis engine which may be a learning engine as well. In the case in which the analysis engine is a learning engine, the rules engine of the analysis engine may receive feedback from, for example, a user to determine if an anomaly should be detected or if a detected anomaly was not indicative of an intrusion into the network, and may change the rules accordingly to incorporate or reflect this feedback. The anomaly detection engine also reports metadata about the network traffic seen by network nodes (versus full copies of network frames, logs, or only SNMP alerts), and uses a system network configuration change notification to reduce the false positive rate of the anomaly detection analysis or to reclassify the resultant notification. Still further, this system may perform metadata gathering and/or analysis at network infrastructure devices (e.g. switches, routers, firewalls) versus centralized servers/appliances, may perform metadata gathering and/or analysis at endpoint devices (e.g. controllers, RTUs, I/O servers, workstations, servers) versus centralized servers/appliances, and may perform the metadata gathering and/or analysis using an FPGA, TCP offload engine, or other programmable hardware. Still further, the system may use hierarchical metadata gathering within a network node or across network nodes, and may perform metadata gathering based on the absence of traffic and/or analysis at endpoint devices (e.g., controllers, RTUs, I/O servers, workstations, servers) based on the system network configuration.

While the security techniques described herein have been described as being used in conjunction with networked process control devices and systems using Ethernet and various known process control protocols, such as Fieldbus, HART and standard 4-20 ma protocols, the security techniques described herein can, of course, be implemented in any type of control device using any other process control communication protocol or programming environment and may be used with any other types of devices, function blocks or controllers. Although the security features described herein are preferably implemented in software, they may be implemented in hardware, firmware, etc., and may be executed by any other processor associated with a computer device. Thus, the methods and routines and systems described herein may be implemented in a standard multipurpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or to a process control system via any known or desired delivery method including, for example, on a computer readable disk or other transportable computer storage mechanism or modulated over a communication channel such as a telephone line, the internet, etc.

Moreover, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. An anomaly detection system for use in a communications network having a plurality of network nodes communicatively coupled by a communication link, comprising:
   a plurality of message modules, wherein each of the plurality of message modules executes on a processor at one of the network nodes to detect message traffic at the network node and to generate metadata about the message traffic at the network node;
   an analysis engine stored in and executed at a processing device coupled to the communications network including;
   a metadata memory,
   a controller that executes on a processor of the processing device to receive the metadata about each of the network nodes from the plurality of message modules, and that stores the received metadata in the metadata memory, a rules database that stores a set of logic rules to be used to process the metadata, the stored set of logic rules including one or more rules defined based upon a configuration of the communications network,
wherein the configuration of the communications network defines a manner in which one or more nodes from the plurality of network nodes operate to produce the message traffic about which the metadata is generated, and wherein at least the one or more rules based upon the configuration of the communications network are selected, prior to the receiving of the metadata at the analytics engine, to be used to process the metadata,
a rules engine that executes on a processor of the processing device to process the metadata stored in the metadata memory using the set of logic rules stored in the rules database to detect a traffic pattern anomaly in the communications network, and
a notification module that executes on a processor of the processing device to send a notification of a detected anomaly to a user.

2. The anomaly detection system of claim 1, wherein the analysis engine further includes a metadata baseline database that stores baseline information regarding metadata collected for the communications network during operation of the communications network during a baseline time period, and wherein the rules engine executes on a processor of the processing device to process the metadata stored in the metadata memory using the set of logic rules stored in the rules database and the baseline information stored in the metadata baseline database to detect a traffic pattern anomaly in the communications network.

3. The anomaly detection system of claim 2, further including a configuration change detection module stored in a further processing device coupled to the communications network, that executes on a processor of the further processing device to detect a configuration change to the configuration of the communications network and that sends a notice of a detected configuration change to the analysis engine.

4. The anomaly detection system of claim 3, wherein the controller of the analysis engine changes a logic rule in the rule database based on the detected configuration change.

5. The anomaly detection system of claim 4, wherein the controller receives a new logic rule from a user prior to changing a logic rule in the rule database.

6. The anomaly detection system of claim 4, wherein the controller changes a logic rule based on a type of configuration change.

7. The anomaly detection system of claim 4, wherein configuration change detection module communicates a type of a configuration change to the analysis engine.

8. The anomaly detection system of claim 4, wherein controller of the analysis engine collects a new set of baseline metadata for the communications network in the metadata database in response to the detected configuration change and generates a new set of baseline information from the new set of baseline metadata for the communications network running with the new configuration.

9. The anomaly detection system of claim 3, wherein the configuration change detection module is stored in a configuration database.

10. The anomaly detection system of claim 2, wherein the metadata baseline database stores one or more metadata parameters reflecting a limit or a range to be used by one or more of the set of logic rules to detect an anomaly using the metadata stored in the metadata memory.

11. The anomaly detection system of claim 1, wherein the rules engine is a learning engine.

12. The anomaly detection system of claim 1, wherein the notification module executes on a processor to set a communications parameter in one or more network nodes of the communications network.

13. The anomaly detection system of claim 12, wherein the notification module executes to set a communications parameter that prevents one of the one or more network nodes of the communications network from communicating on the communications network.

14. The anomaly detection system of claim 12, wherein the notification module executes to set a communications parameter that prevents one or more network nodes of the communications network from communicating with another network.

15. The anomaly detection system of claim 12, wherein the notification module executes to set a communications parameter that prevents one of the one or more network nodes of the communications network from allowing a particular application to communicate on the communications link.

16. The anomaly detection system of claim 12, wherein the notification module executes to set a communications parameter that prevents one of the one or more network nodes of the communications network from communicating particular types of messages on the communications link.

17. The anomaly detection system of claim 1, wherein the analysis engine is located in a processing device at one of the network nodes that is directly connected to the communications link of the communications network.

18. The anomaly detection system of claim 1, wherein the analysis engine is located in a processing device that is not directly connected to the communications link of the communications network.

19. The anomaly detection system of claim 1, wherein at least one of the plurality of message modules is located in a processing device in a sub-network of the communications network.

20. The anomaly detection system of claim 1, wherein one of the message modules is disposed in a process controller device coupled to one or more field devices to control a process or industrial plant.

21. The anomaly detection system of claim 1, wherein each of the message modules includes an incoming message module that analyzes messages received at a network node via the communications link.

22. The anomaly detection system of claim 1, wherein each of the message modules includes an outgoing message module that analyzes messages transmitted on the communications link from a network node.

23. The anomaly detection system of claim 1, wherein the notification module sends the notification via the communications link of the communications network.

24. An anomaly detection system for use in a plant environment, comprising:
a communications network including a multiplicity of network nodes each having a processor and a computer readable memory, the multiplicity of network nodes interconnected by a communications link;
a plurality of message modules, wherein each of the message modules executes on the processor at a different one of the network nodes to detect message traffic at the network node and to generate metadata about the message traffic at the network node;
an analysis engine communicatively coupled to each of the plurality of message modules, wherein the analysis engine executes on a processing device coupled to the communications network including;
   a metadata memory,
   a controller that executes on a processor of the processing device to receive the metadata about each of the network nodes from the plurality of message modules, and that stores the received metadata in the metadata memory,
   a rules database that stores a set of logic rules to be used to process the metadata, the stored set of logic rules including one or more rules defined based upon a configuration of the communications network,
      wherein the configuration of the communications network defines a manner in which one or more nodes from the multiplicity of network nodes operate to produce the message traffic about which the metadata is generated, and wherein at least the one or more rules based upon the configuration of the communications network are selected, prior to the receiving of the metadata at the analytics engine, to be used to process the metadata,
   a rules engine that executes on a processor of the processing device to process the metadata stored in the metadata memory using the set of logic rules stored in the rules database to detect a traffic pattern anomaly in the communications network, and
   a notification module that executes on a processor of the processing device to send a notification of a detected anomaly.

25. The anomaly detection system of claim 24, further including a configuration change detection module stored in a further processing device coupled to the communications network, that executes on a processor of the further processing device to detect a configuration change to the configuration of the communications network and that sends a notice of a detected configuration change to the analysis engine.

26. The anomaly detection system of claim 25, wherein the configuration change detection module communicates a type of a configuration change to the analysis engine.

27. The anomaly detection system of claim 25, wherein the controller of the analysis engine collects a set of baseline metadata for the communications network in the metadata database in response to the detected configuration change and generates a set of baseline information from the set of baseline metadata for the communications network with the new configuration and wherein the rules engine uses the set of baseline information in implementing the stored set of logic rules to detect an anomaly.

28. The anomaly detection system of claim 25, wherein the configuration change detection module is stored in a configuration database connected to the communications link.

29. The anomaly detection system of claim 25, wherein the configuration change detection module is stored in a processing device that is not directly connected to the communications link.

30. The anomaly detection system of claim 24, wherein the analysis engine further includes a metadata baseline database that stores baseline information regarding metadata collected for the communications network during operation of the communications network during a baseline time period, and wherein the rules engine executes on a processor of the processing device to process the metadata stored in the metadata memory using the set of logic rules stored in the rules database and the baseline information stored in the metadata baseline database to detect a traffic pattern anomaly in the communications network.

31. The anomaly detection system of claim 30, wherein the metadata baseline database stores one or more metadata parameters reflecting a limit or a range to be used by one or more of the stored set of logic rules to detect an anomaly using the metadata stored in the metadata memory.

32. The anomaly detection system of claim 24, wherein the notification module executes on a processor of the processing device to set a communications parameter in one or more network nodes of the communications network.

33. The anomaly detection system of claim 32, wherein the notification module executes to set a communications parameter that prevents one of the one or more network nodes of the communications network from communicating on the communications link.

34. The anomaly detection system of claim 24, wherein the analysis engine is located in a processing device at one of the network nodes that is directly connected to the communications link of the communications network.

35. The anomaly detection system of claim 24, wherein at least one of the plurality of message modules is located in a processing device in a sub-network of the communications network.

36. A method of performing anomaly detection in a plant communications network having a plurality of network nodes interconnected by a communications link, comprising:
   analyzing message traffic at two or more of the plurality of network nodes using a processor at each of the two or more of the plurality of network nodes to create metadata about the message traffic at each of the two or more of the plurality of network nodes;
   electronically sending the created metadata from each of the two or more of the plurality of network nodes to an analysis engine located in a computer processing device coupled to the communications network;
   storing the metadata from each of the two or more of the plurality of network nodes on a computer readable memory at the computer processing device;
   storing a set of baseline metadata parameters in a computer readable memory at the computer processing device;
   analyzing the stored metadata at the analysis engine, using a processor at the computer processing device, using a set of logic rules and the stored baseline metadata parameters, to determine if there is an anomaly in the traffic pattern at one or more of the network nodes of the communications network,
      wherein the set of logic rules includes one or more rules defined based upon a configuration of the communications network, wherein the configuration of the communications network defines a manner in which one or more nodes from the plurality of network nodes operate to produce the message traffic about which the metadata is generated, and wherein at least the one or more rules defined based upon the configuration of the communications network are selected, prior to sending of the created metadata to the analysis engine, to be used to analyze the metadata; and
   performing an action to correct the anomaly in the traffic pattern when an anomaly is detected in the traffic pattern at one or more of the network nodes of the communications network.

37. The method of claim 36, wherein sending the created metadata includes sending the created metadata from the two or more of the plurality of network nodes to the analysis engine over the communications link.

38. The method of claim 36, further including detecting a configuration change to the configuration of the communications network and sending a notice of a detected configuration change to the analysis engine.

39. The method of claim 38, further including changing one of the set of logic rules used to analyze the stored metadata based on the detected configuration change.

40. The method of claim 38, further including communicating a type of the detected configuration change to the analysis engine and changing one of the set of logic rules used to analyze the stored metadata based on the type of configuration change.

41. The method of claim 38, further including, in response to the detection of a configuration change, collecting a new set of metadata based on operation of the communications network after the configuration change, and generating a new set of baseline metadata parameters from the new set of metadata, for use by the analysis engine in analyzing metadata from one or more of the network nodes of the communications network.

42. The method of claim 36, furthering including performing the analyzing step on a processor of a computer device directly connected to the communication link of the communications network.

43. The method of claim 36, wherein performing an action to correct the detected anomaly includes sending a notice to a user of the detected anomaly.

44. The method of claim 36, wherein performing an action to correct the detected anomaly includes preventing one of the network nodes of the communications network from communicating on the communications link.

45. The method of claim 36, wherein performing an action to correct the detected anomaly includes preventing one of the network nodes of the communications network from allowing a particular application to communicate on the communications link.

46. The method of claim 36, wherein performing an action to correct the anomaly includes preventing one of the network nodes of the communications network from communicating particular types of messages on the communications link.

47. The method of claim 36, wherein analyzing message traffic at one of the two or more of the plurality of network nodes includes analyzing message traffic at each of a multiplicity of sub-nodes of the one of the two or more of the plurality of network nodes, and creating metadata for the message traffic at each of the multiplicity of sub-nodes.

* * * * *